Jan. 17, 1928.
P. C. P. BOOTY
1,656,878
RECEPTACLE FOR FACE POWDER AND THE LIKE
Filed May 28, 1927
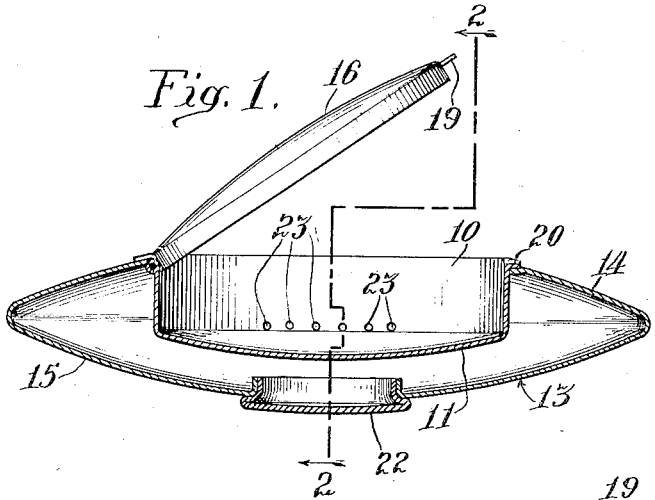
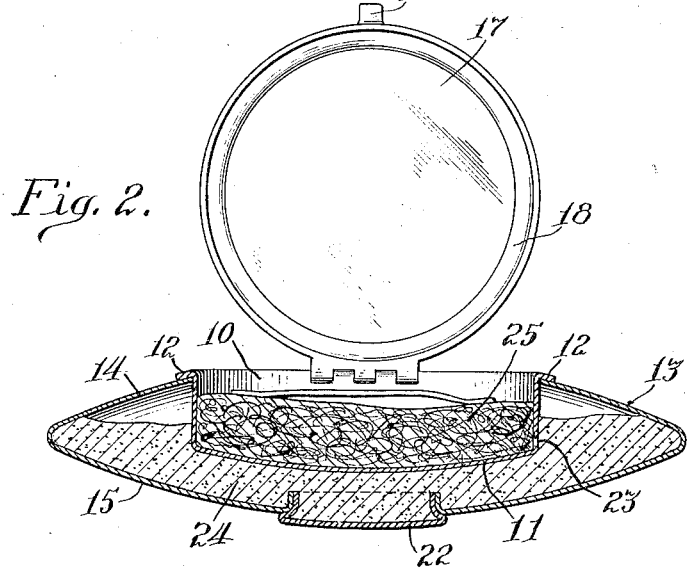
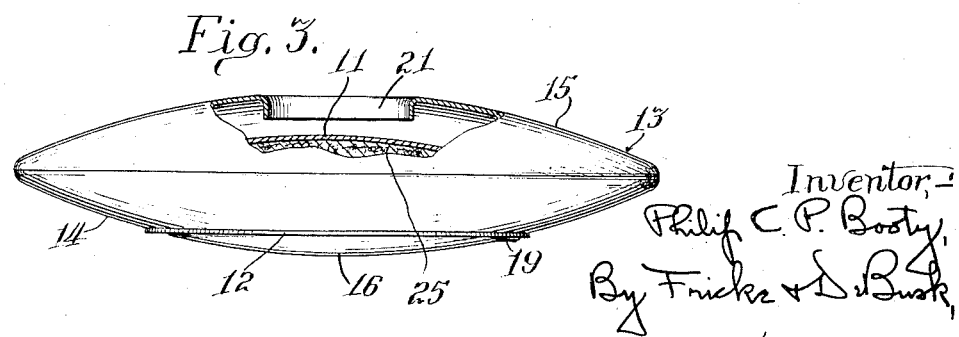
Inventor,
Philip C. P. Booty,
By Fricke & DuBusk,
Attorneys Patented Jan. 17, 1928.

1,656,878

UNITED STATES PATENT OFFICE.

PHILIP C. P. BOOTY, OF CHICAGO, ILLINOIS, ASSIGNOR OF ONE-HALF TO MICHAEL T. DALEY, OF CHICAGO, ILLINOIS.

RECEPTACLE FOR FACE POWDER AND THE LIKE.

Application filed May 28, 1927. Serial No. 195,038.

My invention relates to receptacles for face powder and the like and has for its object the provision of a new and improved form and arrangement of parts by the use of which loose powder can be carried to advantage and dispensed in small quantities as desired. To this end, it is one of the objects of my invention to provide a construction which shall comprise suitable dispensing means in connection with a receptacle for holding a fairly large quantity of powder, the arrangement being such that the powder is protected against becoming caked in such manner as to cause the dispensing means to fail to operate. It is another object of my invention to provide a novel form of dispensing means by which a small quantity of powder may be sifted out from the main body of powder into a deep chamber having a smooth inner surface from which the powder can very readily be taken up by a suitable puff. It is another object of my invention to provide a construction which may be relatively shallow or thin in thickness and in which there is a chamber for a thick powder puff, with an opening or openings leading into the chamber at one side thereof and communicating with a receptacle for powder, the arrangement being such that the puff when in position in the chamber effectively closes the opening for preventing the passage of the powder therethrough.

It is another object of my invention to improve devices of this type in sundry details hereinafter pointed out. The preferred means by which I have accomplished my several objects are illustrated in the drawing and are hereinafter specifically described. That which I believe to be new and desire to cover by Letters Patent is set forth in the claims.

In the drawing,—

Fig. 1 is a central vertical section through my improved receptacle, with the powder puff element removed therefrom.

Fig. 2 is a central vertical section through the device of Fig. 1, taken at line 2—2 of Fig. 1, but with the lid of the receptacle in changed position, with the receptacle partially filled with powder, and with a powder puff in position for closing the powder delivery openings; and Fig. 3 is an edge view of my improved device in inverted position, with the closure member for the filling opening removed and with a portion of the wall broken away.

Referring to the several figures of the drawing, in which corresponding parts are indicated by the same reference characters, 10 indicates a casing preferably made of sheet metal pressed into cylindrical form with the upper face of its bottom wall 11 dished as is best shown in Fig. 1. The casing 10 is provided at its upper edge with an outwardly extending flange 12 by which the casing is supported in a circular opening within an outer casing member 13. The casing member 13 is also preferably formed of sheet metal pressed into shape, comprising an annular top portion 14 and a bottom plate 15, the parts 14 and 15 being formed integrally at their outer edges as is clearly indicated in Figs. 1 and 2. The flange 12 is secured by soldering or in any other suitable manner to the inner edge of the annular portion 14 of the casing member 13 so as to hold the casing 10 in spaced relation to the casing 13 about the sides of the casing 10 and across the bottom thereof.

At one side, the casing 10 has hingedly connected thereto a closure member or lid 16 also preferably formed of sheet metal, being equipped with a mirror 17 on its inner face, held in position by means of a ring 18. A tongue 19 projecting from the free edge of the lid 16 fits within a groove 20 pressed in the flange 12 at the side thereof opposite the hinge of the lid, the arrangement being such that the user of the box is able to open the lid by the use of his thumb nail inserted under the tongue 19. The lid 16 is preferably held in closed position by friction.

Upon its bottom face, the casing 13 is provided with a flanged opening 21, best shown in Fig. 3, within which a closure member 22 is secured by friction so as to be readily removable therefrom. In the form shown in the drawing, the closure member 22 is formed from sheet metal pressed into shape.

With the device in the condition as shown in Fig. 3, a quantity of face powder or the like is poured into the receptacle 13 through the opening 21, and the closure member 22 is pressed into position for closing the opening. The arrangement is such that the powder is unable to escape from the casing 13 at any point except through a plurality of transversely extending openings 23 formed in the side wall portion of the casing 10. As is shown in Fig. 2, the powder in the casing 13, indicated by the numeral 24, stands opposite the openings 23 in direct contact with the side wall portion of the casing 10 in which the openings 23 are provided. The powder is prevented from escaping through the openings under normal conditions, however, by reason of the provision of a thick, heavy powder puff 25 which is held removably in position in contact with the inner ends of the openings 23, as is clearly shown in Fig. 2. In the construction shown, the powder puff 25 is of such shape and size as substantially to fill the casing 10 where it is held in position by its frictional engagement with the wall of the casing. Clearance, however, is provided for the entrance of the lid 16 within the casing to the necessary extent for effectually closing the top of the casing.

In use, the powder puff 25 is first removed from the casing 10 and the casing 13 is shaken or is tapped at one side thereof for sifting the desired quantity of powder through the openings 23 into the bottom of the chamber provided by the casing 10. Inasmuch as the inner surface of the chamber is smooth throughout, it is an easy matter to pick up the loose powder from the bottom of the chamber by the use of a portion of the puff. Upon the return of the puff 25 to the position as shown in Fig. 2, the openings 23 are effectually closed by the puff so as to prevent the escape of the powder from the receptacle provided by the casing 13 about the casing 10.

By my construction, I have provided a receptacle within which the powder contents are protected very effectively from moisture, and within which no pressure is applied upon the powder. There is no part which at any time has a movement inwardly with respect to the chamber 13 such as to have any tendency to compress the powder therein. If, however, there should be any slight tendency for the powder to pack within the casing 13, such tendency can be very readily overcome by striking or tapping the edge of the box transversely thereof, serving to loosen the powder therein.

By the provision of a box of the shape as shown in the drawing and with the arrangement as shown and described, I have evolved a construction which is very neat and convenient. The casing 13 extending some little distance beyond the casing 10 entirely thereabout provides a means for grasping the box firmly with one hand while the puff is being removed from its chamber and is being manipulated for picking up the powder from the casing 10, the fingers of the hand holding the box being so placed as not to interfere with the handling of the puff. Furthermore, by reason of this construction ample provision is made for a considerable quantity of powder so that it is not necessary for the user to be continuously refilling the receptacle with powder. By providing a deep chamber 10, I am able to provide for the use of a large, thick puff which is much to be preferred for effective use. In this way also ample provision is made against the possibility of the powder escaping through the openings 23 past the edge of the puff when it is in position within the casing 10.

While I prefer to employ the form of construction as illustrated in the drawing, it will be understood that I do not wish to restrict my invention to the form as shown, except so far as the claims are so restricted by the state of the art, inasmuch as it will be evident that changes may well be made in the form and arrangement of parts without departing from the spirit of my invention.

I claim:—

1. A receptacle for face powder and the like, comprising in combination a receptacle for powder having side walls disposed at an angle with respect to the top and bottom thereof and having a limited transversely extending opening in one of its side walls, and a powder puff held removably in position with one of its edge portions closing said opening.

2. A receptacle for face powder and the like, comprising in combination a receptacle for powder, a chamber adjacent thereto at one side thereof and having side walls disposed at an angle to its bottom and provided with a transversely extending opening in one of its side walls leading from the receptacle to the chamber, and a powder puff substantially filling said chamber and removable therefrom serving when in position in the chamber to close said opening by an edge portion thereof being held over the opening.

3. A receptacle for face powder and the like, comprising in combination a deep chamber having side wall portions disposed at an angle to the bottom thereof and having a transversely extending opening through one of its said side wall portions, means for holding powder and communicating with said opening, and a thick powder puff held removably in said chamber with an edge portion of the puff in close contact with said opening and serving to close the opening.

4. A receptacle for face powder and the like, comprising in combination a receptacle for powder, a chamber in the form of a well extending into said receptacle and having side walls disposed at an angle to the bottom and provided with a transversely extending opening in one of its side walls for the entrance of powder from the receptacle into the chamber, and a powder puff held removably in position in said chamber with an edge portion of the puff over said opening to close the same.

5. A receptacle for face powder and the like, comprising in combination a circular chamber formed of sheet metal and having a transversely extending opening in a side wall portion thereof, a powder container also formed of sheet metal extending about the chamber in spaced relation to the side wall and bottom wall portions of the chamber, a closure member removably held within a filling opening in the wall of said container, a lid swingingly mounted in position to close the top of said chamber, and a powder puff held removably in position in said chamber for closing said transversely extending opening.

6. A receptacle for face powder and the like, comprising in combination a chamber having side walls disposed at an angle to its bottom and provided with a transversely extending opening in one of its side walls, a powder container adjacent said chamber and in communication with said opening, means removably positioned to close a filling opening in one wall of said container, a lid for closing said chamber, and a powder puff held removably in position in said chamber with an edge portion of the puff over said opening to close the same.

PHILIP C. P. BOOTY.